United States Patent
Tutusaus et al.

(10) Patent No.: US 11,498,846 B2
(45) Date of Patent: Nov. 15, 2022

(54) METHOD FOR SYNTHESIS OF SOLVENT-FREE LITHIUM BORON CLUSTER BASED SALTS

(71) Applicant: Toyota Motor Engineering & Manufacturing North America, Inc., Plano, TX (US)

(72) Inventors: Oscar Tutusaus, Ann Arbor, MI (US); Rana Mohtadi, Northville, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 195 days.

(21) Appl. No.: 16/929,510

(22) Filed: Jul. 15, 2020

(65) Prior Publication Data

US 2022/0017375 A1    Jan. 20, 2022

(51) Int. Cl.
| | |
|---|---|
| *C01D 15/00* | (2006.01) |
| *H01M 10/0525* | (2010.01) |
| *H01M 4/58* | (2010.01) |
| *H01M 10/0562* | (2010.01) |

(52) U.S. Cl.
CPC ............. *C01D 15/00* (2013.01); *H01M 4/58* (2013.01); *H01M 10/0525* (2013.01); *H01M 10/0562* (2013.01); *H01M 2300/002* (2013.01); *H01M 2300/0065* (2013.01)

(58) Field of Classification Search
CPC .......... H01M 4/58; H01M 10/0562; H01M 2300/002; H01M 2300/0065; C01D 15/00
See application file for complete search history.

(56) References Cited

U.S. PATENT DOCUMENTS

| | | |
|---|---|---|
| 4,201,839 A | 5/1980 | Johnson et al. |
| 7,311,993 B2 | 12/2007 | Ivanov et al. |
| 7,465,517 B2 | 12/2008 | Ivanov et al. |
| 7,981,388 B2 | 7/2011 | Ivanov et al. |
| 2005/0053841 A1 | 3/2005 | Ivanov et al. |
| 2006/0204843 A1 | 9/2006 | Ivanov et al. |
| 2018/0175456 A1 | 6/2018 | Lavallo et al. |
| 2020/0343580 A1* | 10/2020 | Yushin .................. H01M 10/44 |

OTHER PUBLICATIONS

Chen, Z. et al., "Lithium Borate Cluster Salts as Redox Shuttles for Overcharge Protection of Lithium-Ion Cells," Electrochemical and Solid-State Letters, 13 (4) A39-A42 (2010).

* cited by examiner

*Primary Examiner* — Stewart A Fraser
(74) *Attorney, Agent, or Firm* — Christopher G. Darrow; Darrow Mustafa PC

(57) ABSTRACT

An effectively solvent-free alkali metal or alkali earth metal closo-borate salt is prepared in the presence of a non-aqueous solvent where the solvent can be removed to levels below one mole percent of the salt. The process involves the exchange of cations with a closo-borate anion via an acid-base process or a metathesis process. The solvent is removed from the alkali metal or alkali earth metal closo-borate salt by heating. The temperature can be greater than the melting point of the salt but lower than temperatures where decomposition occurs.

20 Claims, 1 Drawing Sheet

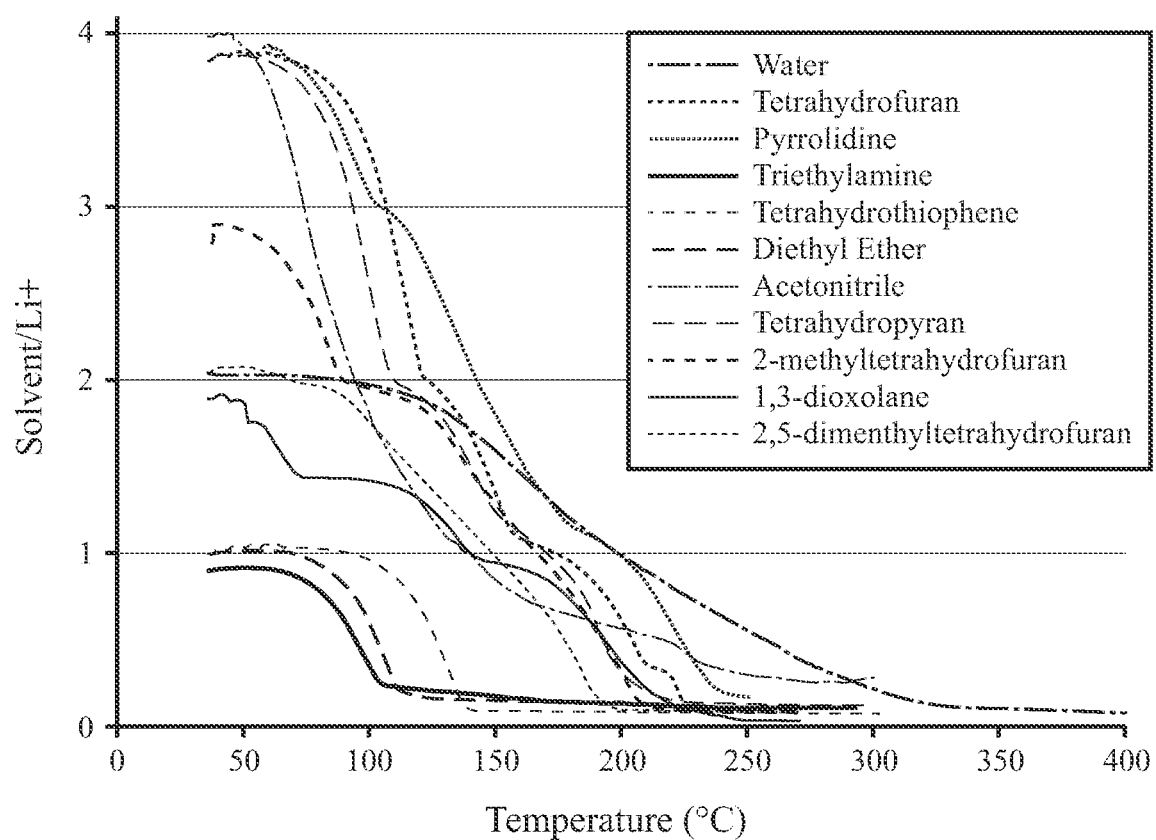

METHOD FOR SYNTHESIS OF SOLVENT-FREE LITHIUM BORON CLUSTER BASED SALTS

TECHNICAL FIELD

The present disclosure generally relates to electrochemical cells, more particularly, to batteries having electrolytes with boranyl salts.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

There is an increasing demand for batteries where performance exceeds that of typical Li-ion batteries. To achieve superior energy and power densities, lithium boron cluster salts are of interest for use as electrolytes in these batteries. Large anion sizes make closo-borates, such as $B_{12}H_{12}^{-2}$, $B_{10}H_{10}^{-2}$, $CB_{11}H_{12}^{-1}$, and $CB_9H_{10}^{-1}$, particularly attractive for solid-state batteries, as these anions display orientation mobility, a dynamic frustration, that allows order-disorder phase transitions, which leads to high cation mobility for enhanced ion conduction. These anions allow electrolytes with conductivity exceeding $10^{-3}$ S cm$^{-1}$ at room temperature when paired with alkali metal cations.

Generally, solid-state electrolytes are best when free of solvent, allowing optimally function. Current methods to prepare lithium closo-borates that easily provide a relatively pure salt free of reagents often fail to completely remove all solvent and lead to salts with low electrochemical windows and prone to adverse reactions at the surfaces of electrodes. For example, a common synthesis is carried out by the acid-base reaction between a trialkylammonium boron cluster salt and lithium hydroxide in water. While the lithium closo-borate salt can be easily isolated, reactions between B—H groups and water occur before the complete removal of water occurs and the resulting solvent-free lithium salt is not of high purity. Synthesis in nonpolar solvents is reported, but the reaction stoichiometry and modes of isolation that do not correct for off-stoichiometric reactions result in impure lithium closo-borate salts. The reagents employed in these methods often present safety challenges for scale-up of these preparations.

Accordingly, to realize robust and optimally conductive solid-state electrolytes of lithium closo-borate salts, there remains a need for a synthesis and isolation of high purity solvent-free closo-b orate salts.

SUMMARY

Disclosed, in various non-limiting embodiments, are methods directed to the synthesis of alkali or alkali-earth metal closo-borate salts that are isolatable as a solvent-free salt of high purity. The closo-borate has at least one hydrogen substituted boron unit or boron and carbon units and may possess halogen, alkyl, aryl, alkoxy, and/or aryloxy substituents in addition to the hydrogen substituents on the boron or boron and carbon units. The method involves the exchange of a closo-borate coupled with a first salt cation with an alkali or alkali-earth metal coupled with a second salt anion in solution, followed by removal of any reaction by-products and solvents to achieve an effectively solvent-free alkali or alkali-earth metal closo-borate salt in high yield and purity.

In one embodiment, provided herein, is a method to synthesize lithium closo-borate salts that are isolatable as a solvent-free salt of high purity. The closo-borate has exclusively hydrogen substituted boron or boron and carbon units or only a modest amount of halogen substituents in addition to the hydrogen substituents on the boron or boron and carbon units. An acid-base reaction with a lithium base with an onium salt of the closo-borate is carried out where the reaction by-products and solvents employed can be readily removed from the salt produced.

In one embodiment, provided herein, the second salt anion can be bound to a polymer or resin, where the exchange of the alkali or alkali-earth metal resin bound second salt anion and the first salt cation closo-borate salts in solution allows elution of the alkali or alkali-earth metal closo-borate from the first salt cation second salt anion bound polymer or resin. Alternatively, the first salt cation can be bound to a polymer or resin, where the exchange of the closo-borate coupled to the bound first anion with an alkali or alkali-earth metal second salt anion allows elution of the alkali or alkali-earth metal closo-borate from the first salt cation second salt anion bound polymer or resin. The removal of solvent results in the solvent-free alkali or alkali-earth metal closo-borate salt.

In another embodiment, provided herein, the solvent-free alkali or alkali-earth metal closo-borate salt can be used as a solid-state electrolyte for a solid-state electrochemical device. Accordingly, provided herein is an electrochemical device that includes an anode; a cathode; and an electrolyte that is a solvent-free alkali metal or alkali earth metal closo-borate salt in contact with the anode and the cathode. The electrochemical device can be a secondary battery or a subunit of a secondary battery. The anode is an electrode where alkali metal or alkali earth metal oxidation occurs during the device's discharge and at which alkali metal or alkali earth metal reduction occurs during the device's charge. Similarly, the cathode is an electrode where a cathode material reduction occurs during the device's discharge and a cathode material oxidation occurs during the device's charge.

These and other features of the effectively solvent-free electrolyte and its preparation will become apparent from the following detailed description when read in conjunction with the FIGURE and examples, which are exemplary, not limiting.

BRIEF DESCRIPTION OF THE DRAWINGS

For a better understanding of the processes and devices having a solvent-free closo-borate electrolyte, with regard to the particular variations and examples discussed herein, reference is made to the accompanying FIGURE, in which:

FIG. 1 shows a composite of plots for the mole ratio of solvent to lithium cation vs. temperature for the removal of various solvents from a Li closo-borate salt.

It should be noted that the FIGURE set forth herein is intended to exemplify the general characteristics of the methods, algorithms, and devices among those of the present technology, for the purpose of the description of certain aspects. The FIGURE may not precisely reflect the characteristics of any given aspect and are not necessarily intended to define or limit specific embodiments within the scope of this technology.

DETAILED DESCRIPTION

The present disclosure provides a method to prepare electrolytes for a solid-state electrochemical device, such as a solid-state battery, where the electrolyte is an alkali metal or alkali earth metal closo-borate. The synthesis involves exchange of a first salt cation coupled with the closo-borate and an alkali metal or alkali earth metal coupled with a second salt anion in solution. The solvent can be a single solvent or a plurality of solvents. The synthesis is carried out in an organic solution, from which subsequent removal of the solvent(s) form an effectively solvent-free alkali metal or alkali earth metal closo-borate.

The present disclosure provides a method to prepare electrolytes for a solid-state electrochemical device where the electrolyte is a lithium closo-borate or other alkali metal or alkali earth metal closo-borate that is effectively solvent-free. Although the lithium closo-borate, for example, is prepared in an organic solvent, the final solvent residue is sufficiently low, allowing use of the alkali metal or alkali earth metal closo-borate as an effectively solvent-free salt, with solvent levels of less than one mole percent.

In one embodiment, a first solvent can be one that provides solubility to a protonated amine salt of the closo-borate, for example a trialkylammonium salt, which is the first salt cation. A second solvent can be one that provides solubility to the lithium second salt anion salt. The first solvent and the second solvent can be the same or different and the first solvent, the second solvent, or both can be a mixed solvent of two or more chemical compositions. Any solvent can be or contain a polar aprotic solvent. The solvent can act as a monodentate ligand toward $Li^+$ or other alkali metal or alkali earth metal cations, yet the solvent is sufficiently volatile to be removed below the decomposition temperature of the product alkali metal or alkali earth metal closo-borate. The maximum temperature employed for the solvent removal can be a temperature greater than the melting point of the alkali metal or alkali earth metal closo-borate salt.

The alkali metal or alkali earth metal closo-borate can have the structure $M(C_mB_iH_{(m+i)-j}Z_j)_n$ wherein: M is Li, Na, K, Cs, Rb, Be, Mg, Ca, or Sr; n is 1 or 2; m is 0, 1, or 2; m+i is 6 to 12; j is 0 to m+i−1; and Z is halogen, alkyl, alkoxy, arylalkyl, aryl, aryloxy, or alkylaryl, wherein any of the non-halogen Z's can be partially or completely fluorinated. The halogen can be F, Cl, Br, or I. Any alkyl group of the alkyl, alkoxy, arylalkyl, or alkylaryl can be linear, branched, or cyclic.

In one embodiment, a lithium closo-borate is selected from one or more of $Li_2B_{12}H_{12}$, $Li_2B_{10}H_{10}$, $LiCB_{11}H_{12}$, $LiCB_9H_{10}$, $Li_2B_{12}H_{12-x}Z_x$, $Li_2B_{10}H_{10-y}Z_y$, $LiCB_{11}H_{12-x}Z_x$, and $LiCB_9H_{10-y}Z_y$, where x is less than or equal to 6; y is less than or equal to 5; and Z is a halogen, alkyl, alkoxy, arylalkyl, aryl, aryloxy, or alkylaryl, where any alkyl or aryl group can be substituted with a halogen, wherein any of the non-halogen Z's can be partially or completely fluorinated. The lithium closo-borate can be a single salt having a single anion structure or can be a mixed salt having a mixture of different anion structures.

In another embodiment, the alkali metal or alkali earth metal closo-borate further includes a salt of the same alkali metal or alkali earth metal cation and a second salt anion. The second salt anion can be one that does not detract from the ion conductivity of the pure alkali metal or alkali earth metal closo-borate, and can enhance the ion conductivity. In this case, the formation results in a mixed anion salt where the proportions of the closo-borate and second salt anion can be controlled by the product of the proportion of the anions mixed and the relative affinities of the anions for the desired alkali metal or alkali earth metal and a first salt cation. Second salt anions can be $ClO^-$, $SO_4^{-2}$, $CF_3SO_3^-$, $PF_6^-$, $BF_4^-$, $F^-$, $Cl^-$, or any other anion that does not detract from the ion conductivity of the alkali metal or alkali earth metal mixed anion salt.

In an embodiment, the exchange of the first salt cation and the alkali metal or alkali earth metal occurs where the anion coupled with the second cation is a base that is soluble in a second solvent and undergoes an acid-base reaction with the first salt cation. The first salt cation can be an ammonium ion or a phosphonium ion. The second solution is mixed with the closo-borate salt in a first solution. The first and/or second solvents can include one or more amines, phosphines, ethers, or thioethers. The first and/or second solvent can include an alkyl or aryl hydrocarbons. The first and second solvents can be a mixed solvent of two or more compounds. Typically, but not necessarily, the solvent does not act as a bidentate ligand or polydentate ligand, which are typically more resistant to removal from the second cation closo-borate salt produced. The solvent can be selected to have a boiling point of 250° C. or less, for example 200° C. or less, 150° C. or less, or 100° C. or less. The solvent is one that is evaporated from the alkali metal or alkali earth metal closo-borate salt upon heating at about one atmosphere pressure or can be a solvent that is removed at a reduced pressure.

The first salt cation can be an ammonium or phosphonium cation that is paired with the closo-borate anion. The second solution has a solute that is an alkali metal or alkali-earth metal coupled with an amide, phosphide, or carbanion base. For example, the ammonium ion can be trimethylammonium ion or any protonated trialkyl amine or can be any protonated ammonia, primary, secondary or tertiary amine of the structure $R^1R^2R^3NH$ or a phosphonium ion can be trimethylphosphonium ion or any protonated trialkyl phosphine or can be any protonated phosphine, primary, secondary or tertiary phosphine of the structure $R^1R^2R^3PH$, where $R^1$, $R^2$, and $R^3$ are independently hydrogen or a one to ten carbon alkyl, aryl, alkylaryl, trialkylsilyl, or aryldialkylsilyl groups. The ammonium ion can be a pyridinium ion or any other protonated aromatic or non-aromatic nitrogen or phosphorous heterocycle. The base can be any amide (azanide) or phosphide of an alkali metal or alkali earth metal of the structure, $R^4R^5N^-$ or $R^4R^5P^-$ that displays solubility in an amine, phosphine, ether, thioether, or any other solvent or mixed solvent, including non-polar solvents where solubility can be imparted by its affinity with the base structure rather than or in addition to an affinity for the cation. $R^4$ and $R^5$ are independently a one to ten carbon alkyl, aryl, alkylaryl, trialkylsilyl, or aryldialkylsilyl groups. Any alkyl group of the alkyl, alkylaryl, trialkylsilyl or aryldialkylsilyl can be linear, branched, or cyclic. The base can be a carbanion of the structure $^-CH_2R$ or $^-CHR_2$ where R is alkyl, alkenyl, aryl, pyridyl, cyano, C(O)alkyl, C(O)Oalkyl, Salkyl, or any other carbanion, where two R groups can be combined to form a cyclic carbanion.

In one exemplary embodiment, the trimethylammonium closo-borate in tetrahydrofuran (THF), a first solution, is combined with lithium hexamethyldisilazane amide in THF, a second solution, according to the equation:

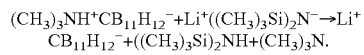
$$(CH_3)_3NH^+CB_{11}H_{12}^- + Li^+((CH_3)_3Si)_2N^- \rightarrow Li^+ CB_{11}H_{12}^- + ((CH_3)_3Si)_2NH + (CH_3)_3N.$$

The reaction can be carried out on stoichiometry or with an excess of either salt solution. When the acid base reaction is carried out on stoichiometry, the lithium closo-borate can remain in solution, spontaneously precipitate from solution, or be precipitated upon addition of a non-solvent for the lithium closo-borate. When the reaction is carried out with an excess of either salt solution, the separation of the excess reagent is required to have a pure lithium closo-borate. Precipitation of the lithium closo-borate, where the excess reagent remains in solution, results in the isolation of the lithium closo-borate from the excess reagent.

As with the formation of the lithium closo-borate, above, the proton transfer from the first salt cation to the basic second salt anion results in the formation of an alkali metal or alkali earth metal closo-borate with or without precipitation of the closo-borate salt. The rate and mode of mixing the first solution and the second solution can be controlled to diminish the temperature increase due to a reaction exotherm. The first or second solution can be cooled prior to mixing and/or during mixing. The first solution can be added to the second solution, the second solution added to the first solution, or the first and second solutions can be added to a solvent or mixed solvent at a rate where mixing and precipitation occurs as desired to affect the nature and particle size of the precipitate being formed. The addition of the two complementary reagents can be carried out to maintain the exact stoichiometry of the reagents in the reaction solution. A solution of the alkali metal or alkali earth metal closo-borate, once formed, can be precipitated by addition of the solution to a non-solvent or by addition of a non-solvent to the reaction vessel or isolated solution of the alkali metal or alkali earth metal closo-borate. The remaining liquid phase after precipitation can be decanted, filtered, centrifuged, or otherwise separated from the precipitated closo-borate salt.

The precipitated closo-borate salt can be washed with the first solvent, the second solvent or a third solvent, or any mixture of those three solvents, whereby any unreacted reagent can be washed from the precipitated closo-borate salt when either the first salt cation closo-borate salt or the alkali metal or alkali-earth metal second salt anion is used in excess and that excess salt is soluble in the washing solvent. The basic second salt anion is chosen to be non-nucleophilic or otherwise unreactive with any portion of the closo-borate or other reagent or solvent in the system. In this manner, the exchange of cations can be complete, leaving the desired alkali metal or alkali-earth metal closo-borate wet with solvent, but otherwise in a highly pure state. The alkali metal or alkali-earth metal of the closo-borate salt can be complexed to the first, second or third solvent.

Choice of an appropriate solvent, including any complexing solvent, can be removed from the alkali metal or alkali-earth metal closo-borate salt by evaporation of the solvent. The precipitated salt can be finely divided by the nature of the precipitation, for example, by a precipitation under rapid agitation or from dilute solution. The removal of the solvent is carried out by heating the alkali metal or alkali-earth metal closo-borate salt in a controlled fashion, where the rate of heating is carried out to allow decomplexation of solvent and its diffusion from the salt. The solvent wet salt can be heated from ambient temperature to any temperature below the decomposition temperature of the alkali metal or alkali-earth metal closo-borate salt to remove the solvent. The removal of solvent can be carried out at a pressure below ambient, such that temperature is maintained below the salt's decomposition temperature.

As shown in FIG. 1, the loss of solvent occurs as the temperature is raised from ambient to a higher temperature, for example to temperatures in excess of 250° C. or more. Depending upon the solvent, the loss of the last portion of solvent, where the cation is complexed, can occur to a high degree, where the loss profile depends upon the solvents employed. Solvents with amine, ether and sulfide can be removed to a high degree. A poorly complexing solvent of lesser volatility than a better complexing solvent in the mixture can assist the removal of the better complexing solvent having a greater volatility. In a mixture of two solvents, formation of an azeotrope can enhance the removal of the better complexing solvent even if that solvent has a higher boiling point than the lesser complexing solvent.

In another embodiment, the exchange of first salt cation coupled with the closo-borate and an alkali metal or alkali earth metal coupled with a second salt anion in solution can occur by a simple metathesis exchange, where the first salt cation is a metal or non-acidic non-metal and the second salt anion is not a base. The exchange occurs upon mixing where either the alkali metal or alkali earth metal closo-borate or the first salt cation second salt anion salt precipitates from the mixed solution spontaneously or upon addition of a non-solvent for at least one of the alkali metal or alkali earth metal closo-borate or the first salt cation second salt anion salt. In either fashion, the separation of the two salts occurs. If the alkali metal or alkali earth metal closo-borate is the soluble salt, filtration of the liquid from the precipitated solid results in a nearly pure form in solution when the metathesis is carried out on stoichiometry. If the stoichiometry is not controlled precisely, one of the precursor salts from the salt solutions will be blended with the alkali metal or alkali earth metal closo-borate. When on stoichiometry, washing the precipitated salt and vessel can improve purity. Washing of a precipitated alkali metal or alkali earth metal closo-borate can be necessary to yield a highly pure salt even when carried out in a dilute solution.

In one embodiment, the second salt anion can be an anion known to have rotator motion, for example $ClO^-$, $SO_4^{-2}$, or $CF_3SO_3^-$, a complex halide anion, for example, $PF_6^-$ or $BF_4^-$, or a simple anion, such as $F^-$ or $Cl^-$. After removal of the solvent, the isolated alkali metal or alkali earth metal closo-borate can be in the form of a mixed anion salt of the closo-borate and the second salt anion having a proportion of closo-borate to second salt anion based on the molar ration of anions combined in solution or by the product of the anions molar ratio and their relative affinities for the first salt cation and alkali metal or alkali earth metal. The first salt cation second salt anion salt can be removed by contacting the solution prepared upon mixing the solution from the first salt cation closo-borate and the alkali metal or alkali earth metal second salt anion, where the first salt cation is a divalent or polyvalent cation by its preferred complexation with a polydentate ligand bound to a polymer or resin comprising a polydentate ligand that selectively binds to the first salt cation. The first salt cation can be an alkali earth metal cation when the alkali metal or alkali earth metal cation is an alkali metal cation. The first salt cation can be a transition metal cation or post transition metal cation.

In one embodiment, a first salt cation closo-borate salt can include a first salt cation that is a polycation, which is part of a polymer or a resin, such as an ion-exchange resin, an anion exchange resin, or a metal ion that is strongly complexed by a polydentate ligand of the polymer or resin and where the polydentate ligand does not competitively complex the alkali metal or alkali earth metal used. An alkali metal or alkali earth metal second salt anion solution can be added to the polymer or resin first salt cation paired with closo-borate where the proportion of the alkali metal or alkali earth metal second salt anion solution is such that the liquid removed from the polymer or resin is a solution of exclusively the alkali metal or alkali earth metal closo-borate solution. The solvent-free alkali metal or alkali earth metal closo-borate is then recovered upon removal of the solvent. The resin can be a cation exchange resin where an alkali metal or alkali earth metal cation is paired with a second salt anion that is bound to a polymer or resin. By adding a first salt cation closo-borate solution to the polymer or resin, an alkali metal or alkali earth metal closo-borate salt solution can be separated from the first salt cation polymer or resin paired with the second salt anion. Removal of the solvent, as disclosed above, allows the recovery of the solvent-free alkali metal or alkali earth metal closo-borate. An ion exchange resin can be, for example, a sulfonated polystyrene cation exchange resins in the $Li^+$ or other alkali metal or alkali earth metal ion form and the first salt cation closo-borate solution can have a first salt cation that is an ammonium or a monovalent or divalent metal cation have a higher affinity for the sulfonate anion or carboxylate anion of the resin than the alkali metal or alkali earth metal cation. An ion exchange resin can be, for example, a polystyrenic strongly basic anion exchange resins of any type that is in a closo-borate form with a bound cation, such as an quaternary ammonium cation where the nitrogen is covalently bonded to the resin. The complementary alkali metal or alkali earth metal second salt anion can have, for example, a strongly absorbing second salt anion, such as, benzene sulfonate, salicylate, citrate, or iodide.

The solvent-free alkali metal or alkali earth metal closo-borate salt can be employed as a solid-state electrolyte for a solid-state electrochemical device. Accordingly, provided herein is an electrochemical device that includes an anode; a cathode; and an electrolyte that is a solvent-free alkali metal or alkali earth metal closo-borate salt in contact with the anode and the cathode.

In an embodiment, the solid electrolyte can be an anhydrous solvent-free alkali metal or alkali earth metal closo-borate can have the structure $M(C_mB_iH_{(m+i)-j}Z_j)_n$ wherein: M is Li, Na, K, Cs, Rb, Be, Mg, Ca, or Sr; n is 1 or 2; m is 0, 1, or 2; m+i is 6 to 12; j is 0 to m+i−1; and Z is halogen, $C_{1-10}$ alkyl, $C_{1-10}$ alkoxy, $C_{1-18}$ arylalkyl, $C_{1-14}$ aryl, $C_{1-10}$ aryloxy, or $C_{1-18}$ alkylaryl, wherein any of the non-halogen Z's can be partially or completely fluorinated. The halogen can be F, Cl, Br, or I. The solvent-free alkali metal or alkali earth metal closo-borate can include one closo-borate or more than one closo-borates with an identical alkali metal or alkali earth metal cation. The solvent-free alkali metal or alkali earth metal closo-borate has no water and less than one mole percent organic solvent in the salt. The solvent-free alkali metal or alkali earth metal closo-borate can be combined as a solvent-free electrolyte with one or more additional alkali metal or alkali earth metal salts with second salt anions selected from be $ClO_4^-$, $SO_4^{-2}$, $CF_3SO_3^-$, $PF_6^-$, $F^-$, $Cl^-$, or any other anion the enhances the metal ion mobility in the electrolyte.

The solid electrolyte can be a solvent-free lithium closo-borate selected from one or more of $Li_2B_{12}H_{12}$, $Li_2B_{10}H_{10}$, $LiCB_{11}H_{12}$, $LiCB_9H_{10}$, $Li_2B_{12}H_{12-x}Z_x$, $Li_2B_{10}H_{10-y}Z_y$, $LiCB_{11}H_{12-x}Z_x$, and $LiCB_9H_{10-y}Z_y$, where x is less than or equal to 6; y is less than or equal to 5; and Z is a halogen, alkyl, alkoxy, arylalkyl, aryl, aryloxy, or alkylaryl, where any alkyl or aryl group can be substituted with a halogen, wherein any of the non-halogen Z's can be partially or completely fluorinated. The solvent-free lithium closo-borate can include one closo-borate or more than one closo-borates.

The solvent-free lithium closo-borate containing solid electrolyte can be used in an electrochemical device. The electrochemical device can be a secondary battery or a subunit of a secondary battery. The anode is an electrode where alkali metal or alkali earth metal oxidation occurs during the device's discharge and at which alkali metal or alkali earth metal reduction occurs during the device's charge. Similarly, the cathode is an electrode where a cathode material reduction occurs during the device's discharge and a cathode material oxidation occurs during the device's charge.

The anode can include any material or combination of materials effective to participate in electrochemical oxidation of the alkali metal or alkali earth metal during the device's discharge. Similarly, the anode can include any material or combination of materials effective to participate in electrochemical reduction of the alkali metal or alkali earth metal cations and to incorporate reduced alkali metal or alkali earth metal during a device's charge. In certain embodiments, the anode can consist essentially of elemental alkali metal or alkali earth metal or include at least one surface layer of elemental alkali metal of alkali earth metal. The anodes can include insertion (i.e. carbon, oxides), alloy (i.e. Si, Sn) and conversion anodes.

The cathode can include any material or combination of materials that undergoes electrochemical insertion of a cathode material during the device's discharge. Similarly, the cathode can include any material or combination of materials for electrochemical extraction of the cathode material during the device's charge. In some variations, the cathode material that is inserted at the cathode during a device discharge and extracted from the cathode during device charging event can include the alkali metal of alkali earth metal.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1. Preparation of Solvent-Free $LiCB_9H_{10}$

A solution of recrystallized LiHIVIDS (9.6 g, 57.4 mmol) in anhydrous THF (25 mL) was added in portions to a stirred $[Et_3NH][CB_9H_{10}]$ (12 g, 54.2 mmol) solution in 40 mL of anhydrous THF. The temperature of the mixture was kept below room temperature throughout the addition. The mixture was warmed to room temperature and 140 mL of anhydrous hexane was added to precipitate a white solid. The suspension was stirred at 10° C. for one hour and the precipitate was collected by filtration. The solid was washed once with 24 mL of a 10° C. 1:2-THF/hexane mixture and twice with 40 mL of dry hexane. The solid was dried under vacuum at room temperature until a constant weight was achieved. Vacuum was removed and the solid was heated to 140° C. for 1 hour, to 200° C. for 1 hour and to 250° C. until the solid achieved a THF level of less than 0.01 moles THF per mole Li by $^1H$ NMR and a yield of 6.7 g (97%). Analysis by $^{11}$B and $^{10}$B NMR confirmed the solid to be LiCB$_9$H$_{10}$ free of any boron cluster decomposition products.

Example 2. Preparation of Solvent-Free LiCB$_{11}$H$_{12}$

A solution of recrystallized LiHMDS (7.9 g, 47.2 mmol) in 25 mL of anhydrous THF was added in portions to 50 mL of [Et$_3$NH][CB$_9$H$_{10}$] (11 g, 44.9 mmol) solution in anhydrous THF with stirring. The temperature of the mixture was kept below room temperature throughout the addition period. The mixture was warmed to 35° C. and anhydrous THF was added until all solid dissolved. Anhydrous hexane (100 ml) was added to precipitate a white solid. The suspension was stirred at 10° C. for one hour and the precipitate was collected by filtration. The solid was washed once with 24 mL of a 10° C. 7:5 THF/hexane mixture and washed twice with 40 mL of dry hexane. The solid was dried under vacuum at room temperature until a constant weight was achieved. Vacuum was removed and the solid was heated to 160° C. for 1.5 hours, and to 250° C. until the solid achieved a THF level of less than 0.01 moles THF per mole of LiCB$_{11}$H$_{12}$ by $^1$H NMR and a yield of 6.6 g (97%). Analysis by $^{11}$B and $^{10}$B NMR confirmed the solid to be LiCB$_{11}$H$_{12}$ free of any boron cluster decomposition products.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A process for preparing a solvent-free alkali metal or alkali earth metal closo-borate salt, the process comprising:
providing a first salt consisting of a first salt cation and a closo-borate;
providing a second salt consisting of an alkali metal or an alkali earth metal and a second salt anion;
providing at least one solvent;
combining the first salt, the second salt, and the at least one solvent to form an alkali metal or alkali earth metal closo-borate;
isolating the alkali metal or alkali earth metal closo-borate; and
removing the at least one solvent by heating and/or vacuuming the alkali metal or alkali earth metal closo-borate salt wherein the at least one solvent is present in an amount less than one mole percent of a solvent-free alkali metal or alkali earth metal closo-borate, wherein the alkali metal or alkali earth metal closo-borate has a structure:

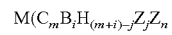

wherein: M is Li, Na, K, Cs, Rb, Be, Mg, Ca, or Sr; n is 1 or 2; m is 0, 1, or 2; m+i is 6 to 12; j is 0 to m+i−1; and Z is F, Cl, Br, I, alkyl, alkoxy, arylalkyl, aryl, aryloxy, or alkylaryl, wherein any non-halogen Z is partially or completely fluorinated.

2. The process according to claim 1, wherein the first salt cation is an ammonium cation or phosphonium cation that is paired with the closo-borate and the second salt anion is an amide, phosphide, or carbanion.

3. The process according to claim 2, wherein the ammonium cation or phosphonium cation has a structure R$^1$R$^2$R$^3$XH$^+$, where X is N or P and R$^1$, R$^2$, and R$^3$ are independently hydrogen, one to ten carbon alkyl, one to ten carbon aryl, one to ten carbon alkylaryl, one to ten carbon trialkylsilyl, or one to ten carbon aryldialkylsilyl.

4. The process according to claim 2, wherein the ammonium cation or phosphonium cation is a substituted or unsubstituted protonated heterocyclic amine, or a substituted or unsubstituted protonated heterocyclic phosphine.

5. The process according to claim 2, wherein amide or phosphide has a structure, R$^4$R$^5$X$^-$, where X is N or P, R$^4$ and R$^5$ are independently hydrogen, a one to ten carbon alkyl, a one to ten carbon aryl, a one to ten carbon trialkylsilyl, or any combination thereof and wherein R$^5$ may further comprise an amine, phosphine, ether, or thioether.

6. The process according to claim 1, wherein the at least one solvent comprises an amine, an ether, and/or a thioether comprising organic solvent having a boiling point of less than or equal to 250° C.

7. The process according to claim 1, wherein the at least one solvent comprises an amine, phosphine, ether, or thioether.

8. The process according to claim 1, wherein first salt cation is covalently bound to a polymer or a resin.

9. The process according to claim 8, wherein first salt cation comprises a quaternary ammonium ion.

10. The process according to claim 1, wherein the second salt anion is covalently bound to a polymer or a resin.

11. The process according to claim 10, wherein second salt anion comprises a sulfonate ion or a carboxylate ion.

12. The process according to claim 1, wherein first salt cation is a divalent or polyvalent metal ion bound to a polymer or resin containing a polydentate ligand and wherein the isolating step comprises separating the solution comprising the alkali metal or alkali earth metal closo-borate from the first salt cation and the second salt anion.

13. The process according to claim 12, wherein the second salt anion is $ClO_4^-$, $CF_3SO_3^-$, $SO_4^{-2}$, $PF_6^-$, $BF_4^-$, $F^-$, or $Cl^-$.

14. The process according to claim 1, wherein the alkali metal or alkali earth metal is lithium and the alkali metal or alkali earth metal closo-borate is selected from one or more of $Li_2B_{12}H_{12}$, $Li_2B_{10}H_{10}$, $LiCB_{11}H_{12}$, $LiCB_9H_{10}$, $Li_2B_{12}H_{12-x}Z_x$, $Li_2B_{10}H_{10-y}Z_y$, $LiCB_{11}H_{12-x}Z_x$, and $LiCB_9H_{10-y}Z_y$, where x is less than or equal to 6; y is less than or equal to 5; and Z is a halogen, alkyl, alkoxy, arylalkyl, aryl, aryloxy, or alkylaryl, where the alkyl, alkoxy, arylalkyl, aryl, aryloxy, or alkylaryl is optionally substituted with one or more halogens.

15. The process according to claim 1, wherein the alkali metal or alkali earth metal closo-borate is a single salt.

16. The process according to claim 1, wherein the alkali metal or alkali earth metal closo-borate salt comprises a mixture of the alkali metal or alkali earth metal closo-borate and an alkali metal or alkali earth metal second salt anion salt.

17. The process according to claim 16, wherein the second salt anion is $ClO_4^-$, $CF_3SO_3^-$, $SO_4^{-2}$, $PF_6^-$, $BF_4^-$, $F^-$, or $Cl^-$.

18. An electrochemical device, the electrochemical device comprising:

a solid-state electrolyte comprising an alkali metal or alkali earth metal closo-borate of the structure:

$$M(C_mB_iH_{(m+i)-j}Z_j)_n$$

wherein: M is Li, Na, K, Cs, Rb, Be, Mg, Ca, or Sr; n is 1 or 2; m is 0, 1, or 2; m+i is 6 to 12; j is 0 to m+i−1; and Z is F, Cl, Br, I, alkyl, alkoxy, arylalkyl, aryl, aryloxy, or alkylaryl, wherein any non-halogen Z can be partially or completely fluorinated;

an anode comprising an alkali metal or alkali earth metal of equal atomic number as a cation of the alkali metal or alkali earth metal closo-borate; and a cathode, wherein the solid-state electrolyte is free of water and has less than one mole percent of an organic solvent relative to the alkali metal or alkali earth metal closo-borate.

19. The electrochemical device according to claim 18, wherein the alkali metal or alkali earth metal closo-borate is selected from one or more of $Li_2B_{12}H_{12}$, $Li_2B_{10}H_{10}$, $LiCB_{11}H_{12}$, $LiCB_9H_{10}$, $Li_2B_{12}H_{12-x}Z_x$, $Li_2B_{10}H_{10-y}Z_y$, $LiCB_{11}H_{12-x}Z_x$, and $LiCB_9H_{10-y}Z_y$, where x is less than or equal to 6; y is less than or equal to 5; and Z is a halogen, alkyl, alkoxy, arylalkyl, aryl, aryloxy, or alkylaryl, where the alkyl, alkoxy, arylalkyl, aryl, aryloxy, or alkylaryl is optionally substituted with one or more halogens.

20. The electrochemical device according to claim 18, wherein the anode comprises an insertion, alloy, or conversion.

* * * * *